United States Patent [19]

Ohira et al.

[11] Patent Number: 4,931,935
[45] Date of Patent: Jun. 5, 1990

[54] USER INTERFACE SYSTEM FOR PERMITTING NATURAL LANGUAGE INTERACTION WITH AN INFORMATION RETRIEVAL SYSTEM

[75] Inventors: Eiji Ohira, Hachioji; Akio Komatsu, Kodaira, both of Japan

[73] Assignee: Hitachi Ltd., Tokyo, Japan

[21] Appl. No.: 214,483

[22] Filed: Jul. 1, 1988

[30] Foreign Application Priority Data

Jul. 3, 1987 [JP] Japan ................. 62-165326

[51] Int. Cl.$^5$ .............................. G06F 15/38
[52] U.S. Cl. ................. 364/419; 364/200; 364/900
[58] Field of Search ............. 364/419, 200, 900

[56] References Cited

U.S. PATENT DOCUMENTS 4,438,505 3/1984 Yanaginchi et al. ........... 364/419
4,744,050 5/1988 Hirosawa ...................... 364/419

FOREIGN PATENT DOCUMENTS 2153560 8/1985 United Kingdom .

OTHER PUBLICATIONS

"GWW: A Structured Environment for Building Natural Language Interfaces", Jeff Pepper et al., Computer, May 1986, pp. 85–88.

"Natural-Language Interfaces", Elaine Rich, Computer, Sep. 1984, pp. 39–47.

Primary Examiner—Michael R. Fleming
Assistant Examiner—Gail O. Hayes
Attorney, Agent, or Firm—Antonelli, Terry, Stout & Kraus

[57] ABSTRACT

A user interface system for information retrieval which includes apparatus for sequentially effecting syntactic and semantic analysis, every time a retrieval request sentence is inputted on words and clauses of the request sentence, apparatus inputted for creating partial syntactic and semantic expressions from successively obtained results of the syntactic and semantic analysis, apparatus for predicting words or clauses which are to be next inputted as the retrieval request sentence by making use of a semantic relation between the syntactic and semantic expression and an associated task, apparatus for displaying candidates for the predicted clauses, and apparatus for taking in selected clauses as subsequent clauses of the retrieval request sentence by and permitting a user to select at least one of the displayed candidates.

4 Claims, 3 Drawing Sheets

FIG. 3

| WORD | LARGEST |
|---|---|
| A PART OF SPEECH | ADJECTIVE |
| CATEGORY | LARGEST |
| LABEL | RELATION |

| WORD | POPULATION |
|---|---|
| A PART OF SPEECH | NOUN |
| CATEGORY | POPULATION |
| LABEL | ATTRIBUTE |

| WORD | THAT |
|---|---|
| A PART OF SPEECH | REL-PRON |
| CATEGORY | UNKNOWN |
| LABEL | RELATION |

| WORD | ○○HIGHWAY |
|---|---|
| A PART OF SPEECH | NOUN |
| CATEGORY | ROAD |
| LABEL | OBJECT |

USER INTERFACE SYSTEM FOR PERMITTING NATURAL LANGUAGE INTERACTION WITH AN INFORMATION RETRIEVAL SYSTEM

BACKGROUND OF THE INVENTION

The present invention generally relates to a user interface system, and more particularly, to a user interface system in which a retrieval request for a retrieval system or the like and retrieval processing of the system can quickly be effected.

A conventional system is, as disclosed in Japanese Patent Laid-Open No. 223883/1974, arranged such that the retrieval processing is initiated after the user has completely inputted all the retrieval request sentences in natural language by use of a keyboard.

If the user inputs the retrieval request sentences in natural language, free inputting is practicable. On the other hand, there arises a problem in which an error in input of a key is created, resulting in troublesomeness, because a good deal of key inputting operations are required as compared with an iconoscope or a mouse.

In the prior art system, syntactic and semantic analysis are effected after the user has finished inputting the retrieval request sentences. Subsequently, the retrieval corresponding to the result of analysis is initiated. For this reason, there is created such a defect that a response of retrieval is delayed.

SUMMARY OF THE INVENTION

It is a primary object of the present invention to provide a user interface system capable of readily inputting retrieval request sentences in natural language and quickly effecting the retrieval.

To this end, according to one aspect of the invention, there is provided a user interface system arranged such that the request sentences to be inputted sequentially undergo a semantic analysis at a word/clause level, a partial syntactic/semantic tree is simultaneously created on the basis of sequentially obtained word/clause semantics; words which are likely to be next inputted are predicted by collating the partial syntactic/semantic tree with an associated task in terms of sematics; the predicted word candidates are displayed; and the words at which the user aims are selected by a mouse or the like from among the displayed word candidates.

On the basis of the semantic relation, the next word is predicted, and the predicted word candidates are displayed. The user selects the words from among the word candidates. This arrangement permits the user to perform an input process simply by selecting the displayed word candidates with the mouse without key-inputting the words. As a result, an amount of key-input can be reduced. By virtue of having such a function, the information required for retrieval can be provided on the part of the system in the middle of inputting the request sentences. Hence, the retrieval processing of a partial answer can be started in the middle of inputting the retrieval request sentences.

The foregoing and other objects, features and advantages of the invention will become more apparent on reading the following detailed description with reference to the accompanying drawings.

BRIEF DESCRIPTION OF THE DRAWINGS

FIG. 3 is a diagram illustrating an example of a word dictionary;

DESCRIPTION OF THE PREFERRED EMBODIMENT

An embodiment in which the present invention is applied to map retrieval will hereinafter be described. Assuming that there is an inquiry such as "Pick up the largest population city that the 00 highway is passing through" in the map retrieval, in accordance with the present invention, this inquiry is processed in the following manner.

Figure 1:
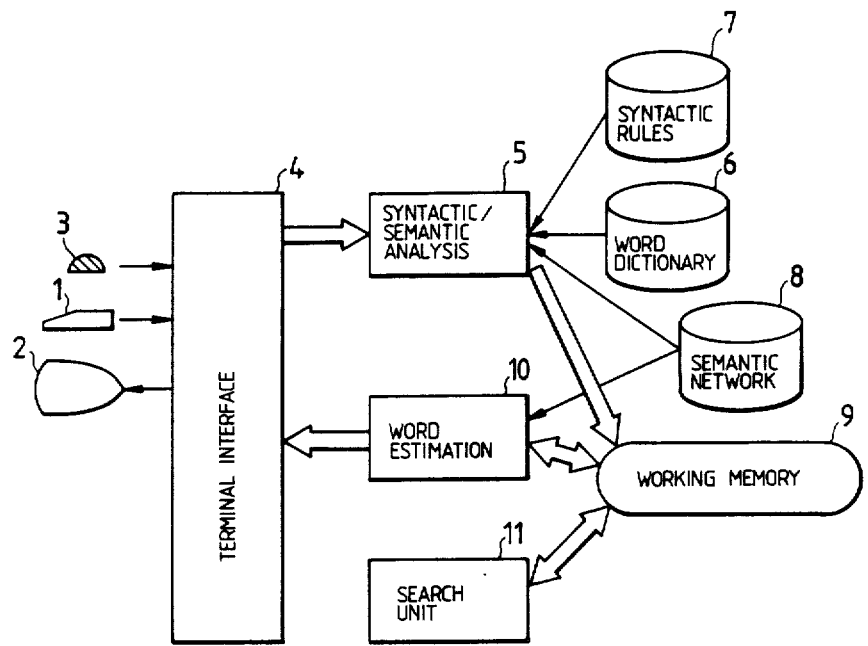
FIG. 1 is a block diagram illustrating one embodiment of the present invention.

To start with, referring to FIG. 1, a request sentence is inputted from a keyboard 1. A terminal input/output unit 4 causes character strings of the request sentence to be displayed on a monitor 2 and then transferred to a syntactic/semantic analyzing unit 5. The syntactic/semantic analyzing unit 5 sequentially processes the inputted request sentences at a word/clause level with the aid of a word dictionary 6, syntactic rules 7 and a semantic network 8. Subsequent to this step, the syntactic/semantic analyzing unit 5 stores the request sentence in a working memory 9 in the form of concepts and designations shown in FIG. 2.

Where the word dictionary 6 is concerned, registration is executed by employing a case-dictionary having, e.g., word names, parts of speech, semantic categories and labels. For instance, words such as "largest", "population", "that" and "00 highway" are expressed in the manner described in FIG. 3.

Figure 2:
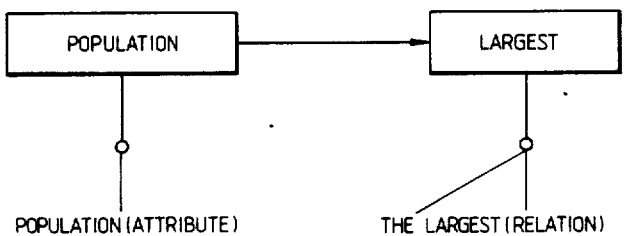
FIG. 2 and 5 are diagrams showing results given by a syntactic/semantic analyzing unit.

Next, the syntactic/semantic analyzing unit 5 executes analysis on the basis of context free grammar by use of the semantic dictionary 7. Namely, the syntactic/semantic analyzing unit 5 examines the presence of a conjuctive relation between the inputted words or phrases adjacent to each other. If the two words or phrases are conjuctive in terms of syntax and semantics, they are combined to be pushed into a push-down stack. Furthermore, names of the two words, semantic categories, labels and the conjuctive relation therebetween are frame-expressed; and such expressions are created in the working memory 9. Partial syntactic/semantic trees depicted in FIG. 2 are thus attained. If there is no conjuctive relation between the two words, the two words are sequentially pushed into the push-down stack.

The syntactic/semantic analysis 5 can be actualized in accordance with a treatise (Tanaka and others: A theory of Shingaku, Vol J60-D, No 12 (1977), titled "Concerning A Program System-Expansion LINGOL For Natural Language). Functions of the frame and the working memory can be actualized by utilizing the existing expert shell technique by which forward inference is effected A word estimation unit 10 serves to monitor the working memory 9 and estimate the subsequent word by means of the semantic network 8 in accordance with the content of partial syntactic/semantic tree generated by the syntactic/semantic analyzing unit 5.

Figure 4:
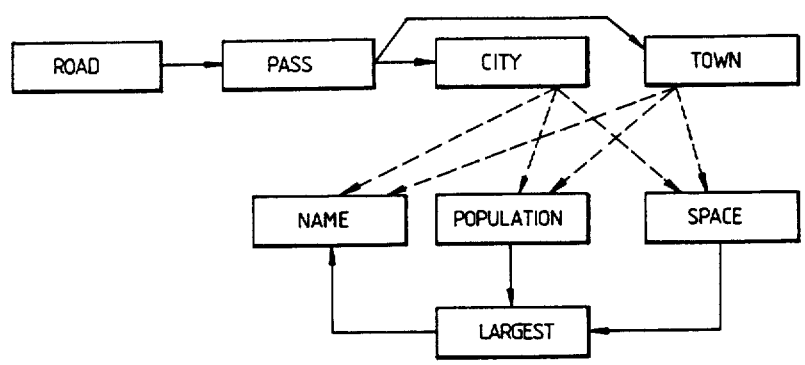
FIG. 4 is a diagram showing an example of a semantic network in map retrieval.

Turning attention to FIG. 4, there is illustrated an example of the semantic network 8 in this field, wherein a solid line indicates a semantic relation between concepts, while a dotted line indicates an attribute relation between the concepts. The attribute is defined as a property inherent in the concept. For instance, it is considered that a "city" has such attributes as a population and area. The semantic network 8 gives an expression in the form of, for example, a fact of Prolog. The relation between the concepts is expressed such as:

relation (population, largest, name)
relation (road, pass, city).

The attribute relation is expressed such as:

attribute (name, city)
attribute (population, city).

The word estimation unit 10 is composed of a plurality of rules which work when uncompleted two or three frames are created in the working memory 9. These rules are characterized such that execution is made on the basis of the rule in which an objective label satisfies the condition, paying attention to labels of the individual frames. According to a rule wherein the condition of execution is that there exists a frame whose one side is connected to other frame and in which the label is relation, and when S1 denotes the category of the frame in which the label is relation and S2 denotes the other category, a question such as:

relation (S2, S1, X); relation (X, S1, S2) is executed by use of the semantic network 8, whereby the subsequent word X is estimated. If X is defined as any attribute, the subsequent word Y is estimated from a question such as:

attribute (X, Y); attribute (Y, X).

In a second example, an answer of Y=(city, town) is obtained from a question such as:

relation (population, largest, X), attribute (X, Y).

These operations can readily performed by a matching function of Prolog.

The word estimation unit 10 transfers the thus estimated subsequent word to a terminal input/output unit 4.

Figure 6:
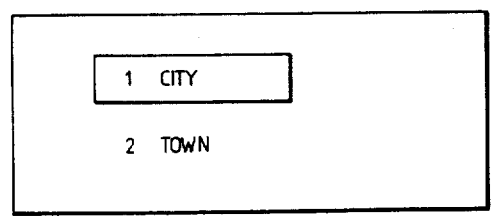
FIG. 6 is a diagram illustrating an example of a window for selecting word candidates.

The terminal input/output unit 4 displays the candidate word on a monitor 2 in the form of, for example, pop-up window depicted in FIG. 6. When the user selects any one of the words (e.g., "city" is selected if the numeral 1 is inputted to the mouse from the click or the key) by using the mouse 3 or the keyboard 1 or a voice input unit (not illustrated), the terminal input/output unit 4 indicates the selected word in the final position of the displayed request sentence, and at the same time transfers this word to the word estimation unit 10. The word estimation unit 10 stores the selected word as an object word into the working memory 9. As a result, the working memory is provided with the set of information required for the retrieval, whereby a search unit 11 is capable of effecting the retrieval. As discussed above, in accordance with the present invention, a mid-answer of retrieval can be obtained in the course of inputting the request sentence, and hence the time necessary for the retrieval can be diminished. In this embodiment, the predicted word is a short one like "city". In the case of longer words, the inputting operations can remarkably be reduced.

The selected word is sent to the syntactic/semantic analyzing unit 5, too. In this case, the syntactic/semantic analyzing unit 5 pushes the selected words en bloc into the push-down stack on the assumption that the head words or phrases of the push-down stack qualify the inputted words.

Figure 5:
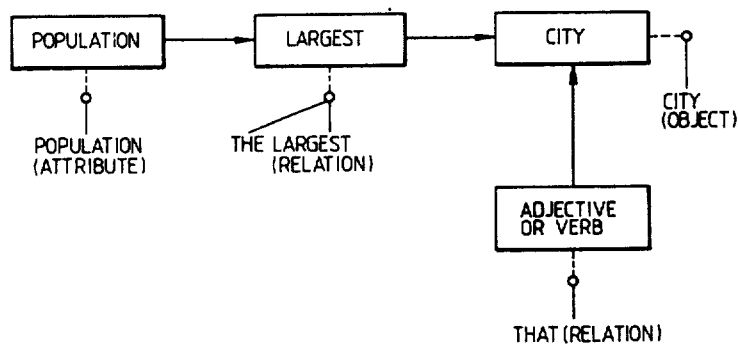

In the second place, when the word "that" is inputted, the syntactic/semantic analyzing unit 5 examines a conjuctive relation with respect to the head noun phrase ("the largest population city" is unitized as one noun phrase) of the push-down stack. As a result of this, the relative pronoun "that" depicted in FIG. 3 is obtained from among a plurality of words "that". In this case, there is no direct conjictive relation therebetween in terms of syntax, and hence the word "that" is pushed into the push-down stack. In the case of relative pronoun, however, as illustrated in FIG. 5, a frame in which the category is unknown and the label is relation is added to the working memory 9.

When "OO highway" is inputted, the syntactic/semantic analyzing unit 5 likewise executes the syntactic/semantic analysis and subsequently connects a frame associated with "OO highway" to the fram e of "that" depicted in FIG. 5. The word estimation unit 10 has a frame in which the category is unknown and the label is relation; and frames are connected to the front and rear portions thereof In this case, let the categories of the front and rear frames be S1 and S2, respectively, and there is provided a rule that the subsequent word is estimated from a question such as:

relation (S1, X, S2), whereby estimation becomes possible owing to the semantic network 8. In the previous example, (X=pass) is obtained from:

relation (city, X, road).

At this time, if the word estimation unit 10 or the syntactic/semantic analyzing unit 5 is invested with a sentence creating function (generator) which works in synchronization with the syntactic analysis, the sentence "is passing through" can be indicated to the user.

In accordance with the present invention, the subsequent words are predicted and displayed in the middle of inputting the request sentence, and these words may be taken in as an inputted sentence. Consequently, the key inputting operations can be saved. The description in this embodiment is focused on the case of the sentence written in English. In the case of a sentence in Japanese, the retrieval is also practicable by obtaining beforehand a partial answer of retrieval on the basis of estimated results in the middle of inputting the request sentence.

Although the illustrative embodiment of the present invention has been described in greater detail with reference to the accompanying drawings, it is to be understood that the invention is not limited to the precise embodiment. Various changes or modifications may be effected therein by one skilled in the art without departing from the scope or spirit of the invention.

What is claimed is:

1. In a variety of systems for information retrieval where natural language is inputted by inputting means, a user interface system for information retrieval, comprising:

means for sequentially effecting syntactic and semantic analysis, every time a retrieval request sentence is inputted, on words and clauses of said retrieval request sentence;

means for creating partial syntactical and semantic expressions from successively obtained results of said syntactic and semantic analysis;

means for predicting words or clauses which are to be next inputted as said retrieval request sentence by making use of a semantic relation between a syntactic and semantic expression and an associated task;

means for displaying candidates for said predicted words or clauses; and means for taking in selected words or clauses as subsequent words or clauses of said retrieval request sentence and permitting a user to select at least one of said displayed candidates.

2. The user interface system for information retrieval according to claim 1, wherein said semantic relation is indicated by forming a semantic network having links indicating semantic relations between concepts and attribute relations between concepts.

3. The user interface system for information retrieval according to claim 1, wherein said means for displaying includes means for multi-window displaying of said candidates.

4. The user interface system for information retrieval according to claim 3, wherein said multi-window displaying means includes means for selecting from said candidates by mouse, keyboard or input of predetermined speech.

* * * * *